Patented Jan. 24, 1933

1,895,367

UNITED STATES PATENT OFFICE

ROBERT ADOLPH BERNHARD, OF BRIGHTON, NEW YORK

ADHESIVE PLASTIC COMPOSITION

No Drawing. Application filed May 9, 1930. Serial No. 451,195.

The object of my invention is the production of a plastic adhesive composition or cement to be used in fastening bandages or surgical dressings, bandage to bandage or bandage to skin.

My composition comprises a mixture of cellulose acetate or other cellulose ester, a suitable solvent such as acetone, ethyl alcohol 30% plus chloroform 70%, ethylene dichloride 70% plus isopropyl alcohol 30%, a plasticizer such as gum benzoin, or camphor, powdered mineral substance such as zinc oxide, talc or precipitated chalk, a dilutant such as toluene, ethyl alcohol, isopropyl alcohol may or may not be used, as desired, a perfume such as heliotropine, menthol or vanillin.

In preparing the composition I prefer to use the ingredients in about the following proportion, viz: 80 cubic centimeters of acetone, 10 grams of 480 sec. viscosity cellulose acetate, 7½ grams of camphor and 2½ grams of gum benzoin. Good results may be obtained, however, when the properties of the ingredients and the ingredients themselves are selected within the following limits, cellulose esters of the viscosity between 5 sec. and 480 sec. may be used. The amount of cellulose ester may vary from 5 to 40%. The plasticizer may be either solvent or non solvent of the cellulose ester or a mixture of both. It may be a liquid, a semi solid or a solid and vary in amounts from one-fourth of 1% to the weight of the cellulose ester present. The solvent may vary from 40 to 80% by volume, and may be a pure chemical or a mixture of chemicals. Any proportion up to 40% of dilutant may be added. The mineral filler may be omitted or added in any proportion provided the weight of the filler does not exceed the weight of the cellulose ester present.

These ingredients are mixed thoroughly into a plastic mass which may be dispensed from a collapsible tube. The viscosity of the finished product to be such that when a small amount is applied to a bandage it will penetrate approximately three layers of 40–44 count cotton gauze cementing the layers together. The proper mixtures will dry to the touch in about 20 seconds. To cement a patch of bandage cloth about 4 or 5 layers thick directly to the skin place the cement on the edges of the patch, leave an area uncemented in the center, apply the cement side to the skin with the uncemented area directly over the injury, gently press the edges to force the cement through the cloth to the surface thereby cementing the patch together as well as to the skin. This patch will dry to the touch in about 90 seconds. If additional protection is desired more cement may be placed on top of the edge of the patch lapping over on the skin. It is not necessary to cement the entire edge of the bandage to the skin.

My composition is strong, quick drying, easily applied, peels off clean when dry, non toxic, impervious to water, mineral oil or gasoline, adheres without cracking, is flexible, has a pleasant odor, not tacky when dry, cheap, has a suitable color, there is no deterioration on standing, and, as a whole, possesses in a high degree all the desired properties of an adhesive for fastening bandages.

I claim:

1. A plastic adhesive composition adapted for fastening bandages, surgical dressings and the like, comprising 5 to 40% of cellulose ester of the viscosity between 5 sec. and 480 sec., ½ to 10% of a mixture in any proportion of gum benzoin and camphor, 0 to 20% of zinc oxide, 40 to 80% of acetone, 0 to 40% of ethyl alcohol.

2. A plastic adhesive composition adapted for fastening bandages, surgical dressings and the like, comprising 5 to 40% of cellulose ester of the viscosity between 5 sec. and 480 sec., ½ to 10% of a mixture in any proportion of gum benzoin and camphor, 0 to 20% of zinc oxide, 40 to 80% of a mixture in any proportion of the following; acetone, chloroform, ethyl alcohol, isopropyl alcohol, ethylene dichloride.

3. A plastic adhesive composition adapted for fastening bandages, surgical dressings and the like, comprising 10 grams of cellulose acetate of 480 sec. viscosity, 2½ grams of gum benzoin, 7½ grams of camphor, 10 grams of zinc oxide, 80 c. c. of acetone.

Dated at Rochester, N. Y., May 7, 1930.

ROBERT ADOLPH BERNHARD.